United States Patent
Baumgart et al.

(10) Patent No.: US 6,205,002 B1
(45) Date of Patent: *Mar. 20, 2001

(54) DISK DRIVE WITH TEXTURED SLIDER CONTACT REGION

(75) Inventors: Peter Michael Baumgart, San Jose; Thomas Allen Gregory, Campbell; Ulla Vasant Nayak, San Jose; Thao Anh Nguyen, Malibu; Michael Luis Ramirez, San Jose; Andrew Ching Tam, Saratoga; Run-Han Wang, San Jose, all of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/874,848
(22) Filed: Jun. 13, 1997
(51) Int. Cl.[7] .................... G11B 5/82; G11B 5/54
(52) U.S. Cl. .............. 360/135; 360/237; 360/97.01
(58) Field of Search ................... 360/135, 103, 360/105–106, 97.01, 235.4–237.1; 428/694 SG, 694 BR, 694 TR

(56) References Cited

U.S. PATENT DOCUMENTS

| | | | |
|---|---|---|---|
| 4,664,963 | 5/1987 | Sakai et al. | 428/142 |
| 4,939,614 | 7/1990 | Shirakura et al. | 360/135 |
| 5,062,021 | 10/1991 | Ranjan et al. | 630/135 |
| 5,208,713 * | 5/1993 | Lindsay et al. | 360/105 |
| 5,319,511 * | 6/1994 | Lin | 360/105 |
| 5,528,922 | 6/1996 | Baumgart et al. | 73/1 |
| 5,550,696 * | 8/1996 | Nguyen | 360/135 |
| 5,586,040 * | 12/1996 | Baumgart et al. | 360/135 |
| 5,595,791 * | 1/1997 | Baumgart et al. | 427/554 |
| 5,729,399 * | 3/1998 | Albrecht et al. | 360/105 |
| 5,734,522 * | 3/1998 | Shrinkle | 360/103 |
| 5,768,058 * | 6/1998 | Hofland | 360/105 |

FOREIGN PATENT DOCUMENTS

| | | |
|---|---|---|
| 3-162716 | 7/1991 | (JP). |
| 4-11324 | 1/1992 | (JP). |
| 4-38716 | 2/1992 | (JP). |
| 4-362517 | 12/1992 | (JP). |
| 5-151733 | 6/1993 | (JP). |
| 5-189758 | 7/1993 | (JP). |

OTHER PUBLICATIONS

IBM TDB Magnetic Disk With Structured Start/Stop (S/S) Track Vo. 27 No. 10A Mar. 1985.
Laser Texturing For Low–Flying–Height Media by R. Ranjan et al J. Appl Phys. 69 (8) Apr. 15, 1991.
Head Parking Zone Research Disclosure Nov. 1988.

* cited by examiner

Primary Examiner—Brian E. Miller
(74) Attorney, Agent, or Firm—Altera Law Group, LLC

(57) ABSTRACT

A disk drive having a disk with a contact start/stop (CSS) region on which a slider can rest is described. The CSS region is divided into at least three zones with the inner and outer zones having a surface topography which is different from the surface topography of the middle zone. The middle zone of the CSS region may be textured with bumps having a lower average height, a lower average density and/or a different bump diameter. The middle zone may also be left untextured. The slider is maintained over the CSS region during spin up and/or spin down.

10 Claims, 4 Drawing Sheets

DISK DRIVE WITH TEXTURED SLIDER CONTACT REGION

FIELD OF THE INVENTION

The invention relates to magnetic disks for use in disk drives with sliders which contact the disk when not operating. More particularly the invention relates to methods for using laser texturing to form a contact start/stop region on the disks.

BACKGROUND OF THE INVENTION

The magnetic surfaces of the disks used for data storage must be extremely smooth with peak-to-valley roughness of some thin film disks being less than 100 Angstroms. The design of most disk drives allows the sliders to rest on the disk surface when the disk is not spinning. If the sliders were allowed to rest on a very smooth surface, the result would be unacceptably high stiction forces between the disk surface and the sliders. For high areal density recording, the slider must fly in close proximity to the disk surface which requires that the surface be very smooth. The trend is, therefore, toward lower flying heights and smoother disks. To reduce the stiction forces between sliders and smooth disks, a band on the disk surface may be deliberately roughened by laser texturing to form a contact start/stop (CSS) region. While the roughened CSS region decreases stiction, it has the undesirable effect of increasing the energy dissipation during disk spin up and spin down. Energy dissipation is directly related to wear.

Various techniques for creating CSS regions have been proposed. Published unexamined Japanese patent application (PUPA) 4-362517 describes the use of a groove in the disk surface adjacent to the CSS in which one rail of the slider rests when the disk is not operating. Alternatively it describes the use of a round protrusion on which the slider rail can rest. Each of these techniques results in the slider being tilted from a parallel position on the disk surface. PUPA 4-38716 suggests cutting spiral grooves into the landing zone under the slider rails. Anonymous Research Disclosure 29563 published in 1988 suggests that "[s]liders with multiple rails may need textured landing zones for one or more of the rails."

Laser texturing of a CSS is described by Ranjan, et al., in J. Appl. Phys. April 1991 p. 5746ff. The average surface roughness (Ra) was varied by altering the beam current. U.S. Pat. No. 5,528,922 describes the use of increased number of laser pulses to increase the height of a peripheral ridge in crater shaped bumps. U.S. Pat. No. 5,062,021 describes the use of laser created bumps to form a CSS region, controlling depth and height of the bumps by varying the laser power and pulse duration, and altering the shape of the bumps by varying the laser beam inclination relative to the disk surface.

SUMMARY OF THE INVENTION

The present invention is a magnetic disk and a disk drive using the disk. The invention reduces the energy dissipated and, therefore, the wear at the head-disk interface during spin up and spin down when the slider is actually contacting the disk surface. This is accomplished by modifying the topography of the contact start/stop (CSS) region on the disk which the slider contacts. The CSS region is conceptually divided into three circular zones on the planar surface the with middle zone having a topography which is different from the inner and outer zones. In the various embodiments of the invention the middle zone topography is manipulated to reduce the energy dissipation during startup and shutdown without sacrificing stiction reduction. In the preferred embodiment the magnetic disk has a series of bumps formed by laser heating which serve as a CSS region. The plurality of bumps on the planar surface form a circular band with at least inner, middle and outer zones in the circular band. In one embodiment the bumps in the middle zone have an average height above the planar surface which is less than the average height above planar surface of the bumps in the side zones. In another embodiment density of bumps in the middle zone is made lower than the density of bumps in the side zones. In a third embodiment diameter of bumps in the middle zone is smaller than in the side zones. The range of bump diameters of interest is typically 1–30 microns. In a fourth embodiment the middle zone is left untextured so that it has the same topography as the data area with no bumps, i.e., zero bump height. Any combination of height, diameter and density reduction for the middle zone can be used for alternative embodiments. If the center rail or pad of the slider has the lowest flying height, the topography of the middle zone is modified to reduce the energy dissipation. The modification depends on the ABS design (location and dimensions of the rails or pads, force on the lowest flying spot on the slider), flying height vs velocity, the pitch of the slider, and the velocity of the disk, etc. The goal is to minimize the energy dissipation or wear through appropriate matching of the slider and disk designs. The width of the zones is selected according to the dimensions of the particular slider which will be used with the disk. The inner and outer zones are arranged to support the side rails of the slider. The boundary between adjacent zones need not be abrupt, the changes in the bump height, diameter, or density (or any combination thereof) can be gradual. The number of zones can vary depending on the design of the slider and where it flies. When a recessed middle zone (reduced height or no bumps) is used with a three rail or pad slider with a trailing center pad, a particular advantage occurs in inducing a positive pitch to the slider which aids in early take-off and reduced energy dissipation. In the case of reduced density bumps, the contact area is reduced for the center pad.

A disk drive using the disk of the invention includes a latch for positioning the inner and outer rails of the slider over the inner and outer zones of the CSS region during the spin up or spin down of the disk.

DETAILED DESCRIPTION OF THE PREFERRED EMBODIMENTS

Figure 1:
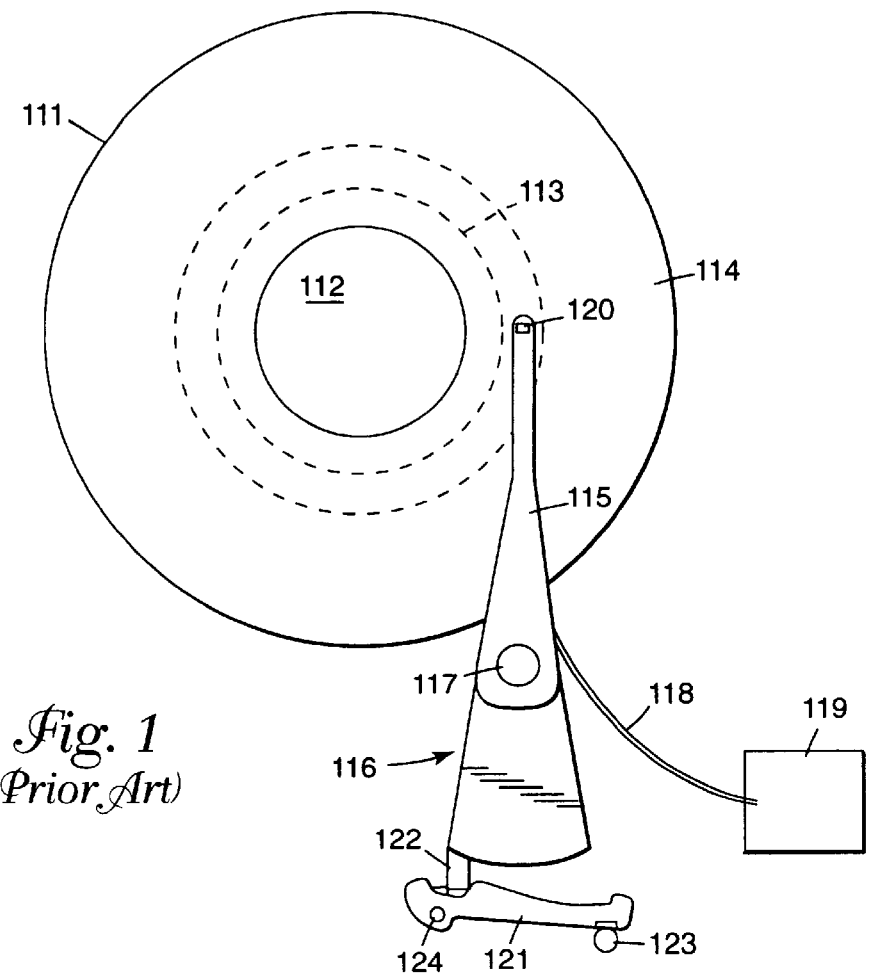
FIG. 1 is a top view of a prior art disk drive with a rotary actuator useful in practicing the present invention.

FIG. 1 is a top view illustrating a disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating. A voice coil motor (VCM) 116 moves the actuator assembly 115 relative to the disks by causing the assembly to pivot around shaft 117. The heads are contained in air bearing sliders adapted for flying above the surface of the disks when rotating at sufficient speed. In operation, when the sliders are flying above the disks the VCM moves the sliders in an arcuate path across the disks allowing the heads to be positioned to read and write from circular tracks formed in the data area 114. Electrical signals to and from the heads and the VCM are carried by a flex cable 118. The various electronics required for signal processing, control and communication are represented by block 119. When not operating and during periods when the rotation of the disks is either starting or stopping, the sliders are positioned in physical contact with the surface of the disks in a landing zone or contact start/stop (CSS) region 113 which is not used for data storage even though the magnetic coating extends over this area. The CSS area is not shown to scale in this figure. The actual width of the CSS region is typically a few millimeters. The CSS region is typically located near the inner diameter (ID) of the disk as shown, but other locations are possible including the use of multiple CSS regions spread across the disk. Various types of latch mechanisms may be used to hold the actuator assembly in a relatively fixed position to limit its movement to a very small tolerance when the disk is not operating or is spinning up or down. The latch mechanism 121 and tab 122 shown in FIG. 1 are intended to be illustrative of latch mechanisms generally. Any type of latch which acts to hold the sliders mounted in the actuator assembly in sufficiently accurate position over the CSS region 113 when the drive is not operating and temporarily during start up can be used with the invention. The latch should restrict the actuator assembly movement sufficiently to ensure that the side rails of the slider remain properly positioned over the CSS region when the disk is spinning up or down, but allow the slider to fly once the disk is rotating at sufficient velocity. The latch is released during spinup after the slider has taken off from the disk due to the buildup of the airbearing. The latch is latched during spin down before the slider has lost the airbearing. Tab 122 extends from the actuator assembly to engage with the latch when in the latched position as shown. A portion of the latch which contacts the tab may conveniently be a resilient member such as leaf spring. Magnet 123 exerts an attractive force on the latch when latching. Both permanent magnets and electromagnets are used in latches and some designs do not use magnets. The latch is typically released by the torque exerted on the actuator assembly by the VMC which causes the latch to pivot counterclockwise around axis 124 to free tab 122 for arcuate movement. In a preferred embodiment of the invention the CSS region is formed from bumps in the substrate surface created by laser heating. The entire disk drive assembly is located within a sealed housing (not shown) to prevent contamination. Although the disk drive has been described with air bearing sliders the principles of the present invention may easily be applied to other storage devices having near contact, or contact recording sliders.

The disk substrate may be an aluminum alloy (typically coated with NiP), glass, glass-ceramic or any material which can be induced to form topographical features such as bumps when heated by a laser or by other chemical or mechanical means. The process of forming bumps on substrates using a laser is known in the art as laser texturing. Techniques and references for laser texturing are described inter alia in U.S. Pat. No. 5,550,696 titled "Magnetic recording disk having textured test band for controlling texture in the slider landing zone." Commonly assigned U.S. Pat. No. 5,595,791 describes a process for laser texturing brittle glass substrates and commonly assigned U.S. Pat. No. 5,595,791 describes a process for laser texturing brittle, non-metallic substrates. Co-pending and commonly assigned U.S. patent application Ser. No. 08/150,525, which is hereby incorporated by reference, describes a programmable laser texturing tool. A computer can be used to control the intensity of the laser pulses in the laser beam, a shutter through which the laser beam passes and a translation stage on which the disk is rotated and moved radially. In this way the intensity of the laser pulses as the beam irradiates various zones on the disk is controllable and can, therefore, be used to create the necessary pattern of bumps to implement one embodiment of the invention. The computer can also be used to control the beam diameter and hence the focused spot size of the laser beam in conjunction with the intensity. In this way, both the spot size and the intensity can be controlled for the various zones on the disk to produce the embodiments of the invention involving changing bump size of the various zones.

After texturing additional layers of thin film materials are typically sputtered onto the disk. Typical layers include an underlayer of chromium, a cobalt alloy magnetic layer and a protective layer of carbon or carbon doped with other elements such as hydrogen, but additional layers may be present. The total thickness of all of the sputtered layers is typically on the order of 100 nm. The pattern of the bumps will be preserved in each thin film layer including the final surface layer. Although sputtering is the most common thin film deposition method, any deposition method which preserves the surface topography can be used with the invention's CSS region.

In one embodiment the CSS region 113 contains a generally spiral pattern formed from tens of thousands of bumps on a 95 mm diameter disk. With current slider sizes the bumps are created to form a 3 to 4 mm wide CSS region. The width of the CSS region is related to the width of the sliders as will be shown. Although the preferred embodiment of the invention uses laser induced bumps, any sufficiently controllable process which results in a roughened surface topography can be used. The bumps can be any geometric shape that extends from the surface of the disk. Using prior art techniques laser bumps can be produced in various shapes including sombrero-like bumps, annular rims or mounds. Sombrero bumps or annular rims are preferable for use with the invention. Although sliders vary in design and contact area, in a fully textured prior art CSS region there are many laser bumps (e.g. 100–500) under the contact area for a typical slider. The diameter of the bumps is 0.5 to 50 microns bump diameter (typically 1 to 30 microns) with spacing of 25 to 100 microns.

The CSS region is at least conceptually divided into three zones which for convenience will be called the inner, middle and outer zones with the inner zone being the one nearest the axis of rotation. These zones are concentric circular bands. In each of the embodiments the surface topography of the middle zone is different from the surface topography of the side zones. The transitions between the zones may be abrupt or the zones may gradually change into the adjacent zone. The altered topgraphy of the middle zone is achieved by lower bump height including zero bump height (i.e., no bumps) and/or by reducing the density of the bumps.

Figure 2:
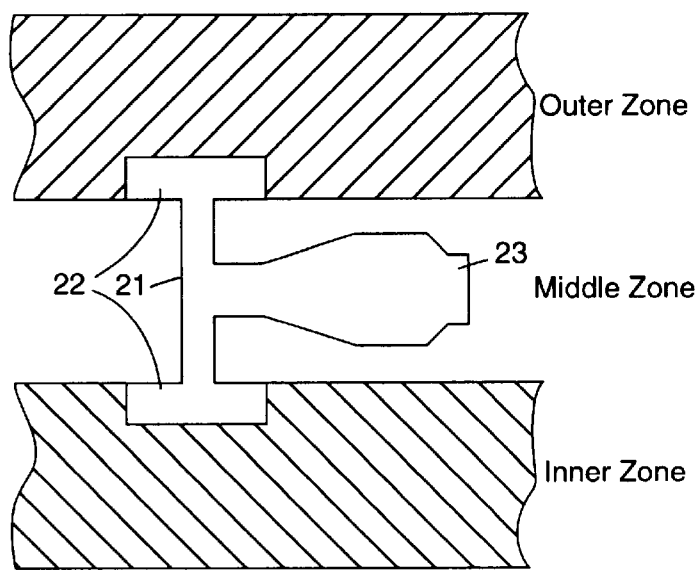
FIG. 2 is a top view of a slider positioned over the CSS of the invention.

Although the CSS region of the invention can be used with a variety of slider designs, FIG. 2 shows a top view of a three rail 50% slider 21 positioned over a CSS region according to the invention. The two outside slider rails 22 are supported by the tops of bumps in the inner and outer zones of the CSS which are generally coplanar. The trailing center rail 23 of this slider may rest on the middle zone or be supported above it.

Figure 3:
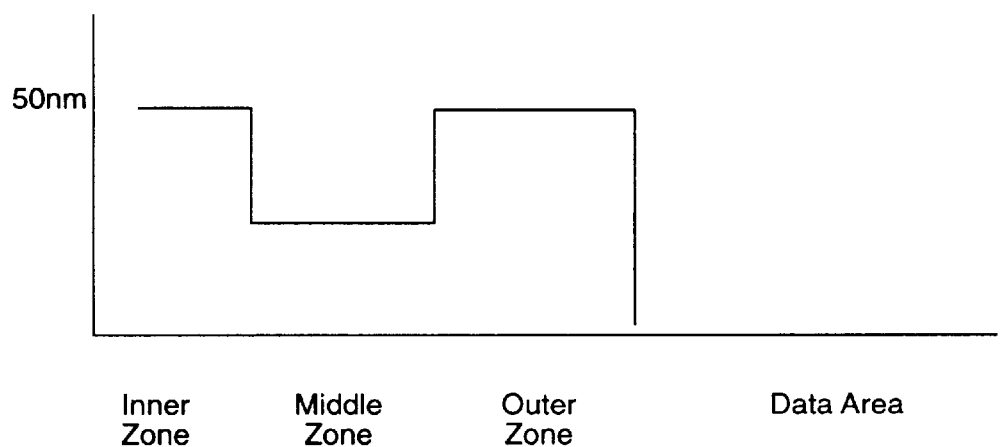
FIG. 3 is a graph showing the average bump height in one embodiment of the CSS of the invention.

The width of a slider as shown in FIG. 2 would be approximately 1.5 mm and the rails are approximately 0.25 mm wide. The need for a latch to restrict the actuator assembly movement when the disk is spinning up or down is evident in this embodiment. If the slider position deviates too far laterally the side rails will not remain at the inner and outer zones. About 2 mm is the maximum width expected for a modern slider. The width of the middle zone should be less than or equal to the distance between the slider rails and in this example the zones are approximately 1 mm wide. About 1.5 mm is the maximum spacing between the slider rails that can be expected. The zones do not need to be of equal width and can be formed in any order, but the spiraling technique is convenient. In the inner and outer zones the bumps are formed with a generally constant height and density although significant variation is allowable due to the relatively large number of bumps which will actually be supporting the slider rails. The actual height of the bumps should be chosen based on the flying height of the slider, but for the inner and outer zones should (with current technology) typically fall between 10 and 80 nm with 15 to 50 nm being preferable. In general lower flying heights require lower bump height; therefore, the trend toward lower flying heights should drive lower bump heights. Whatever the chosen height of the bumps in the inner and outer zones the middle zone will preferably either have 1) bumps which are lower in height; 2) bumps with lower density; 3) bumps with smaller diameter; 4) bumps which are different in two or more parameters of height, diameter and density; or 5) no bumps, i.e., no texture. In each of these cases the energy dissipated, and, therefore the wear, at the head-disk interface during spin up or spin down is reduced. If, for example, the average bump height in the inner and outer zones (O-bumps) is 47 nm, then a reasonable value for the middle zone bumps (M-bumps) would be from 0–25 nm. FIG. 3 shows a graph of the average bump height in the example for 47 nm O-bumps and 25 nm M-bumps. This also serves to illustrate the radial cross sectional view of the CSS region.

Figure 4:
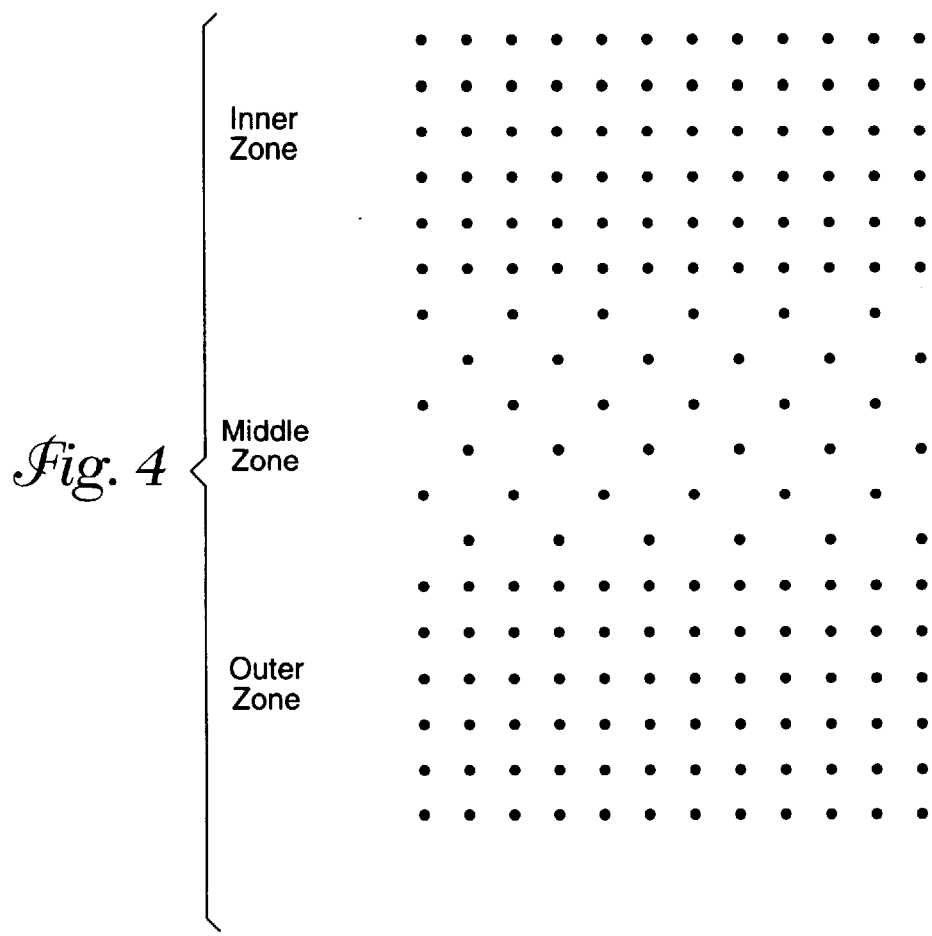
FIG. 4 is a top view showing the average bump density reduction in the middle zone in one embodiment of the CSS of the invention.

Bump density in the inner and outer zones can vary over large range, e.g. 100 to 10,000 per square millimeter, based on the slider being used. If bump density is being used to distinguish the zones, then the density in the middle zone should be reduced to 0–50% of that of the other zones. For example, if the inner/outer zones have a bump pattern of 25×50 bumps in a square millimeter, the middle zone could have a pattern of 25×25 or less resulting in 50% or more reduction in density. FIG. 4 illustrates a top view showing a 50% reduction in density between the outer zone and the middle zone. Reducing the density of the bumps in the middle zone is easily accomplished by increasing the time between pulses as the disk is rotated under the laser and/or increasing the spacing between the arms of the spiral of bumps, i.e., increasing the radial rate at which disk is moved under the laser.

Figure 5:
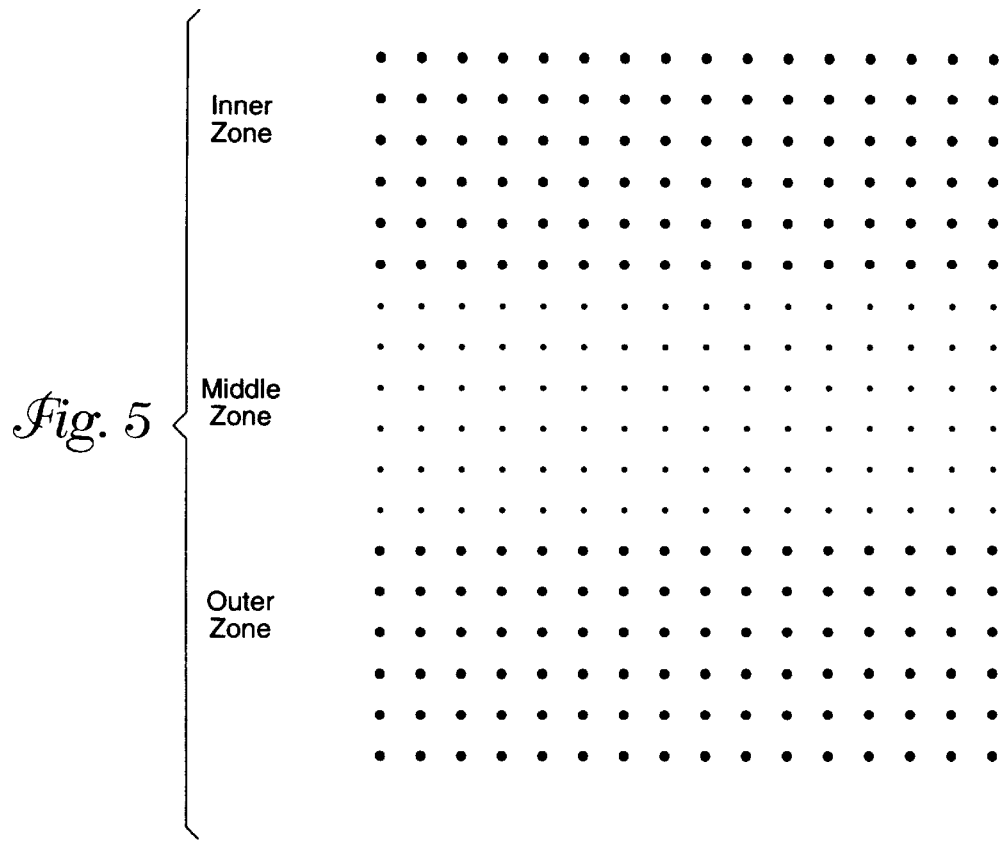
FIG. 5 is a top view showing the average bump diameter reduction in the middle zone in one embodiment of the CSS of the invention.

Another factor influencing energy dissipation is bump diameter. FIG. 5 illustrates a top view showing a 50% reduction in bump diameter between the outer zone and the middle zone. Bump diameter can vary from 1 to 30 microns. If bump diameter is being used to distinguish the zones, then the diameter in the middle zone should be reduced to 0–50% of that of the other zones.

The bump density, diameter and bump height in the middle zone should be adjusted to optimize the trade-off between stiction and wear in the design. A smooth middle zone might result in unacceptable stiction while high and/or dense bumps may give unacceptable wear. The precise height, diameter and density of the bumps in the middle zone which give the best performance will be a function of the details of the system including, the residual smoothness of the untextured disk surface (i.e. the surface in the data area), the slider design and the start/stop performance of the drive.

The height diameter and density of bumps can be varied by changing various parameters of the texturing process as is known in the prior art. Decreasing the laser pulse energy, increasing the pulse width or increasing the focused spot size when the beam expansion is reduced will result in changes in bump height, bump shape or bump diameter. Creating a middle zone without texture simply requires turning the laser texturing off for a period of time while the tool moves the appropriate distance radially.

Comparisons of the measured stiction on disks made with a prior art CSS show no significant change in stiction for the three zone CSS region of the invention when the sliders are accurately positioned. However, using friction force as a function of disk velocity with respect to the slider and the spindle acceleration/deceleration profile one can calculate the energy dissipated at the head-disk interface during spin up or spin down. With the center rail of the slider positioned over the outer zone of the CSS approximately an order of magnitude more energy was dissipated than when the center rail was positioned over the middle zone. Reduced energy dissipation is a predictor of enhanced durability of the slider-disk interface and demonstrates the advantage of the improved CSS performance for the invention.

Figure 6:
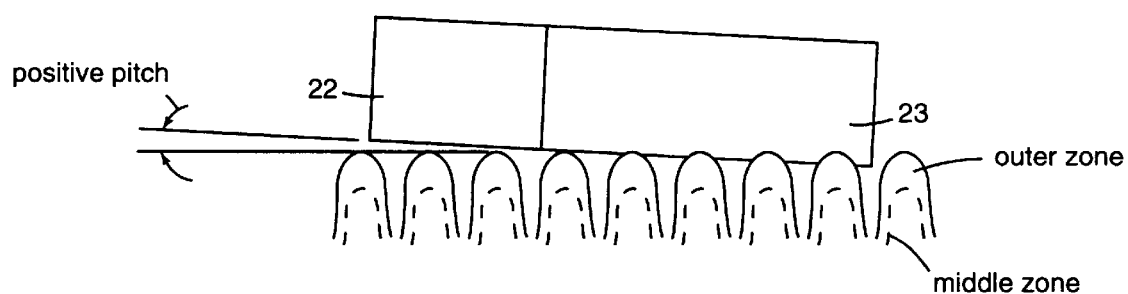
FIG. 6 illustrates a side view of a slider resting on the CSS of the invention.
Figure 7:
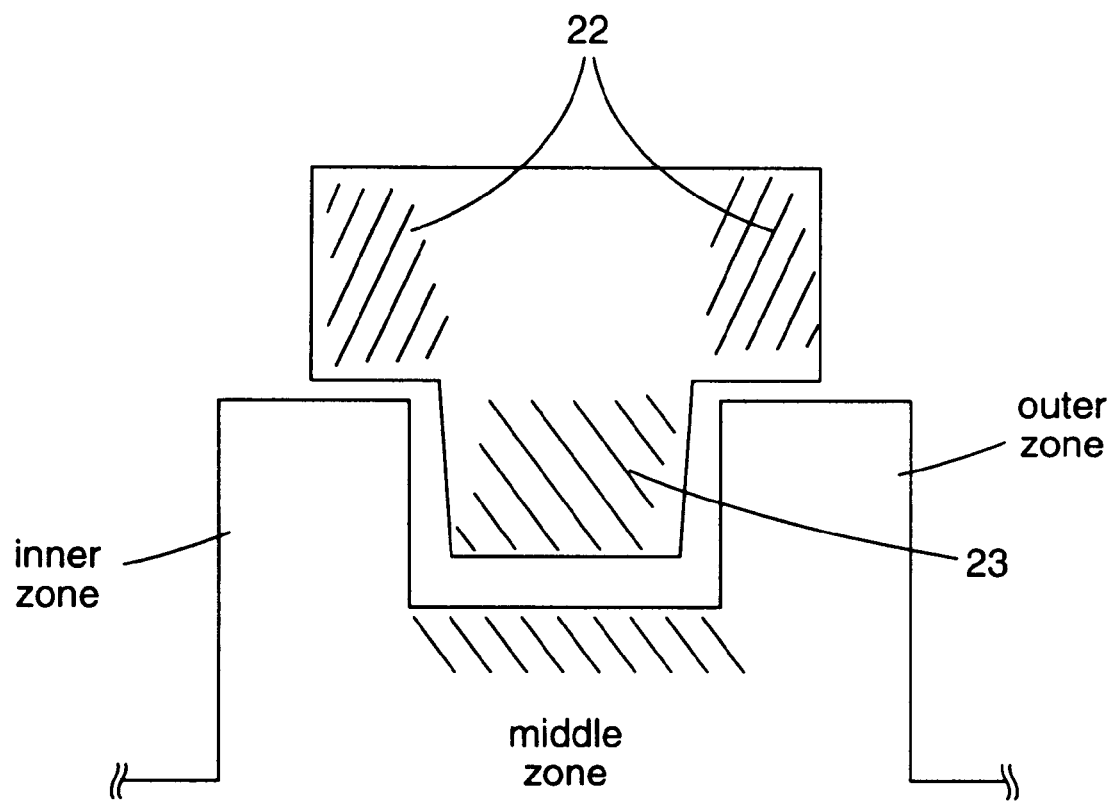
FIG. 7 illustrates a rear view of a slider resting on the CSS of the invention.

An important embodiment of the invention uses a recessed middle zone with a three rail slider with a trailing center pad as illustrated in FIG. 2. A particular advantage occurs in inducing a positive pitch to the slider to aid in early take-off. If the trailing rail or pad 23 drops into the recessed middle zone while the side rails 22 are resting on the higher outer and inner zones as illustrated in FIG. 7, a positive pitching of the slider occurs as illustrated in FIG. 6. The recessed middle zone bumps are indicated in phantom in FIG. 6. Since the trailing pad 23 is narrower than the side rails 22 as shown in FIG. 2, the trailing pad 23 comes to rest below the side rails 22 inducing a positive pitch to the slider. The positive pitch aids in compressing the air at the leading edge of the slider so that the slider will fly at a lower disk velocity than if the slider were sitting flat on the disk. The earlier the take-off the less energy dissipated. The tilt angle may preferably range from 2 to 300 micro-radians depending on the relative heights of the side zones to the middle zone, the length of the slider, the topography of the slider (crown or camber) the pitch of the slider when it is flying, and location of the side rails in contact with the bumps on the side zones.

The laser texturing of disks takes place prior to deposition of the thin film coatings, but may follow certain preparatory steps. For example, typically AlMg substrates are electrolessly plated with NiP and polished as an initial step. Other substrates such as glass are not plated, but may require polishing. The prepared substrate is laser textured and sputtered with the appropriate layers and progressively assembled into a functional disk drive using conventional techniques.

While the invention has been particularly shown and described with reference to a preferred embodiment, it will be understood by those skilled in the art that various changes in form and detail may be made therein without departing from the spirit and scope of the invention.

We claim:

1. A disk drive comprising:

a disk;

a slider having at least first and second side rails and a trailing center pad, the side rails being parallel, coplanar and disposed on outer sides of the slider, the trailing center pad being narrower than a distance between the first and second side rails and centrally disposed on the slider along a horizontal axis which passes between, and parallel to, the side rails, the trailing center pad extending rearward beyond the side rails along the horizontal axis which passes between the side rails;

an actuator assembly on which the slider is mounted in contact with a planar disk surface when the disk is at rest;

a circular contact start/stop (CSS) region on the planar surface of the disk comprising at least inner, middle and outer zones with the inner, middle and outer zones forming concentric circles, the middle zone having a width which is less than or equal to the distance between the rails, with at least the inner and outer zones having a plurality of bumps on the planar surface for supporting a side rail of the slider, the middle zone being recessed in relation to the inner and outer zones by having a plurality of bumps on the planar surface having an average height less than an average height of the bumps in the inner or outer zones; and a latch for limiting the movement of the actuator which when latched simultaneously positions the first side rail in contact with the outer zone and the second side rail in contact with the inner zone and the trailing center pad of the slider over the middle zone to provide a positive pitch to the slider by allowing the trailing center pad to drop into the middle zone while the first and second side rails are supported by the bumps in the inner and outer zones while the disk is at rest.

2. The disk drive of claim 1 wherein the average height of bumps in the middle zone is less than 50% of the average height above planar surface of bumps in the inner and outer zones.

3. The disk drive of claim 1 wherein the middle zone has a plurality of bumps having an average density which is less than an average density of bumps in the inner and outer zones.

4. The disk drive of claim 1 wherein the surface features in the inner and outer zones are bumps from 10 to 80 nm in average height.

5. The disk drive of claim 1 wherein the surface features are bumps are from 1 to 30 microns in average diameter.

6. The disk drive of claim 1 wherein the CSS region has a width of 4 mm or less.

7. The disk drive of claim 1 wherein the middle zone of the CSS region has a width of 1.5 mm or less.

8. The disk drive of claim 1 wherein the middle zone has a plurality of bumps having an average diameter which is less than an average diameter of the bumps in the inner and outer zones.

9. A method of operating a disk drive comprising the steps of:

latching an actuator assembly on which a slider is mounted to position the slider to rest on a circular contact start/stop (CSS) region on a planar surface of a disk, the slider having at least first and second side rails which are coplanar and parallel, and a trailing center pad, the trailing center pad being narrower than a distance between the first and second side rails and centrally disposed on the slider along a horizontal axis which passes between, and parallel to, the side rails, the trailing center pad extending rearward beyond the side rails along the horizontal axis which passes between the side rails, the side rails being disposed on outer sides of the slider, the CSS region being divided into inner, middle and outer zones with the middle zone being recessed in relation to the inner and outer zones by having a surface topography formed from bumps which have a lower average height than bumps of the inner or outer zones;

beginning to rotate the disk while holding the first and second side rails of the slider inner and outer zones respectively of the CSS region while allowing the trailing center pad to drop into the middle zone while the side rails are supported on the bumps in the inner and outer zones to induce a positive pitch to the slider; and releasing the latch after the slider has taken off from the disk.

10. The method of claim 9 further comprising the steps of latching the slider over the CSS region while the disk is rotating and stopping the rotation of the disk allowing the first and second side rails to rest on the inner and outer zones and urging the trailing center pad toward the middle zone causing the slider to have a positive pitch when the disk is at rest.

* * * * *